(12) United States Patent
Salter et al.

(10) Patent No.: US 9,315,145 B2
(45) Date of Patent: Apr. 19, 2016

(54) PHOTOLUMINESCENT TAILGATE AND STEP

(71) Applicant: Ford Global Technologies, LLC, Dearborn, MI (US)

(72) Inventors: Stuart C. Salter, White Lake, MI (US); Cornel Lewis Gardner, Romulus, MI (US); Michael James Whitens, Milford, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/603,681

(22) Filed: Jan. 23, 2015

(65) Prior Publication Data

US 2015/0165963 A1 Jun. 18, 2015

Related U.S. Application Data

(63) Continuation-in-part of application No. 14/086,442, filed on Nov. 21, 2013.

(51) Int. Cl.
*B60Q 1/26* (2006.01)
*B60Q 3/06* (2006.01)
*B60Q 1/30* (2006.01)

(52) U.S. Cl.
CPC ............ *B60Q 1/2661* (2013.01); *B60Q 1/307* (2013.01); *B60Q 3/06* (2013.01); *B60Q 1/302* (2013.01)

(58) Field of Classification Search
USPC ......... 362/541, 485, 543, 487, 496, 505, 600, 362/606, 608, 609, 611–614, 551, 555, 542
See application file for complete search history.

(56) References Cited

U.S. PATENT DOCUMENTS

| 4,745,525 A | 5/1988 | Sheehy |
| 6,729,738 B2 | 5/2004 | Fuwausa et al. |
| 6,773,129 B2 | 8/2004 | Anderson, Jr. et al. |
| 6,871,986 B2 | 3/2005 | Yamanaka et al. |
| 6,990,922 B2 | 1/2006 | Ichikawa et al. |
| 7,213,923 B2 | 5/2007 | Liu et al. |
| 7,264,366 B2 | 9/2007 | Hulse |
| 7,264,367 B2 | 9/2007 | Hulse |
| 7,377,563 B1 | 5/2008 | Demick |
| 7,753,541 B2 | 7/2010 | Chen et al. |
| 7,834,548 B2 | 11/2010 | Jousse et al. |
| 8,016,465 B2 | 9/2011 | Egerer et al. |
| 8,071,988 B2 | 12/2011 | Lee et al. |
| 8,203,260 B2 | 6/2012 | Li et al. |
| 8,237,557 B1 | 8/2012 | Hertz et al. |
| 8,286,378 B2 | 10/2012 | Martin et al. |

(Continued)

FOREIGN PATENT DOCUMENTS

| CN | 201169230 Y | 12/2008 |
| CN | 201193011 Y | 2/2009 |

(Continued)

*Primary Examiner* — Tuyet Vo
(74) *Attorney, Agent, or Firm* — Jason Rogers; Price Heneveld LLP

(57) ABSTRACT

A vehicle illumination apparatus is disclosed. The apparatus comprises a retractable step in connection with a panel of the vehicle. The retractable step comprises a tread portion. A light source is disposed proximate the panel and is configured to emit a first emission having a first wavelength. A first photoluminescent portion is disposed on the tread portion and is configured to emit a second emission having a second wavelength in response to receiving the first emission.

20 Claims, 6 Drawing Sheets

(56) References Cited

U.S. PATENT DOCUMENTS

| | | |
|---|---|---|
| 8,408,766 B2 | 4/2013 | Wilson et al. |
| 8,421,811 B2 | 4/2013 | Odland et al. |
| 8,466,438 B2 | 6/2013 | Lambert et al. |
| 8,519,362 B2 | 8/2013 | Labrot et al. |
| 8,606,430 B2 | 12/2013 | Seder et al. |
| 8,631,598 B2 | 1/2014 | Li et al. |
| 8,724,054 B2 | 5/2014 | Jones |
| 8,773,012 B2 | 7/2014 | Ryu et al. |
| 2003/0179548 A1 | 9/2003 | Becker et al. |
| 2004/0213088 A1 | 10/2004 | Fuwausa |
| 2004/0256833 A1 | 12/2004 | Cervenka |
| 2005/0146888 A1 | 7/2005 | Metcalf |
| 2006/0087826 A1 | 4/2006 | Anderson, Jr. |
| 2006/0290158 A1 | 12/2006 | Cullison |
| 2009/0219730 A1 | 9/2009 | Syfert et al. |
| 2012/0001406 A1 | 1/2012 | Paxton et al. |
| 2013/0335994 A1 | 12/2013 | Mulder et al. |

FOREIGN PATENT DOCUMENTS

| | | |
|---|---|---|
| DE | 29708699 U1 | 7/1997 |
| DE | 10319396 A1 | 11/2004 |
| EP | 1793261 A1 | 6/2007 |
| EP | 2778209 A1 | 9/2014 |
| JP | 2000159011 A | 6/2000 |
| WO | 2006047306 A1 | 5/2006 |
| WO | 2014068440 A1 | 5/2014 |

PHOTOLUMINESCENT TAILGATE AND STEP

CROSS-REFERENCE TO RELATED APPLICATION

This application is a continuation-in-part of U.S. patent application Ser. No. 14/086,442, filed Nov. 21, 2013, and entitled "VEHICLE LIGHTING SYSTEM WITH PHOTOLUMINESCENT STRUCTURE." The aforementioned related application is hereby incorporated by reference in their entirety.

FIELD OF THE INVENTION

The present invention generally relates to vehicle lighting systems, and more particularly, to vehicle lighting systems employing photoluminescent structures.

BACKGROUND OF THE INVENTION

Illumination arising from photoluminescent materials offers a unique and attractive viewing experience. It is therefore desired to incorporate such photoluminescent materials in portions of vehicles to provide ambient and task lighting.

SUMMARY OF THE INVENTION

According to one aspect of the present invention, a vehicle illumination apparatus is disclosed. The apparatus comprises a retractable step in connection with a panel of the vehicle. The retractable step comprises a tread portion. A light source is disposed proximate the panel and is configured to emit a first emission having a first wavelength. A first photoluminescent portion is disposed on the tread portion and is configured to emit a second emission having a second wavelength in response to receiving the first emission.

According to another aspect of the present invention, a vehicle illumination apparatus is disclosed. The apparatus comprises a retractable step in connection with a tailgate. The retractable step comprises a tread portion and is configured to be arranged in an extended position and a retracted position. A light source is disposed proximate the tailgate and configured to emit a first emission. The first emission is directed toward a first photoluminescent portion disposed on the tread portion in the extended position and configured illuminate in response to receiving the first emission.

According to yet another aspect of the present invention, a vehicle illumination apparatus is disclosed. The apparatus comprises a retractable step in connection with a tailgate of the vehicle. The retractable step comprises a tread portion and is configured to be arranged in an extended position and a retracted position. A light source is disposed in a body formed by the tailgate and configured to emit a first emission. A first photoluminescent portion is disposed on the tread portion and configured to illuminate in the extended position in response to receiving the first emission. A second photoluminescent portion is disposed proximate the tread portion and is configured to illuminate in the retracted position.

These and other aspects, objects, and features of the present invention will be understood and appreciated by those skilled in the art upon studying the following specification, claims, and appended drawings.

DETAILED DESCRIPTION OF THE PREFERRED EMBODIMENTS

As required, detailed embodiments of the present disclosure are disclosed herein. However, it is to be understood that the disclosed embodiments are merely exemplary of the disclosure that may be embodied in various and alternative forms. The figures are not necessarily to a detailed design and some schematics may be exaggerated or minimized to show function overview. Therefore, specific structural and functional details disclosed herein are not to be interpreted as limiting, but merely as a representative basis for teaching one skilled in the art to variously employ the present disclosure.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

The following disclosure describes a lighting system for a vehicle configured to illuminate a tread portion of a retractable step. In some implementations, a light source may be utilized to illuminate the tread portion such that the tread portion is visible for safe access to a cargo area of the vehicle. The light source may be configured to emit light at a first wavelength or an excitation emission to excite a first photoluminescent portion disposed proximate the tread portion. The first photoluminescent portion may be configured to convert the first wavelength into a second wavelength or a first output emission. The first wavelength may correspond to a first color of light and the second wavelength may correspond to a second color of light, different from the first color. While the various implementations of the lighting system described herein refer to specific structures demonstrated in reference to at least one automotive vehicle, it will be appreciated that the vehicle lighting system may be utilized in a variety of applications.

Figure 1:
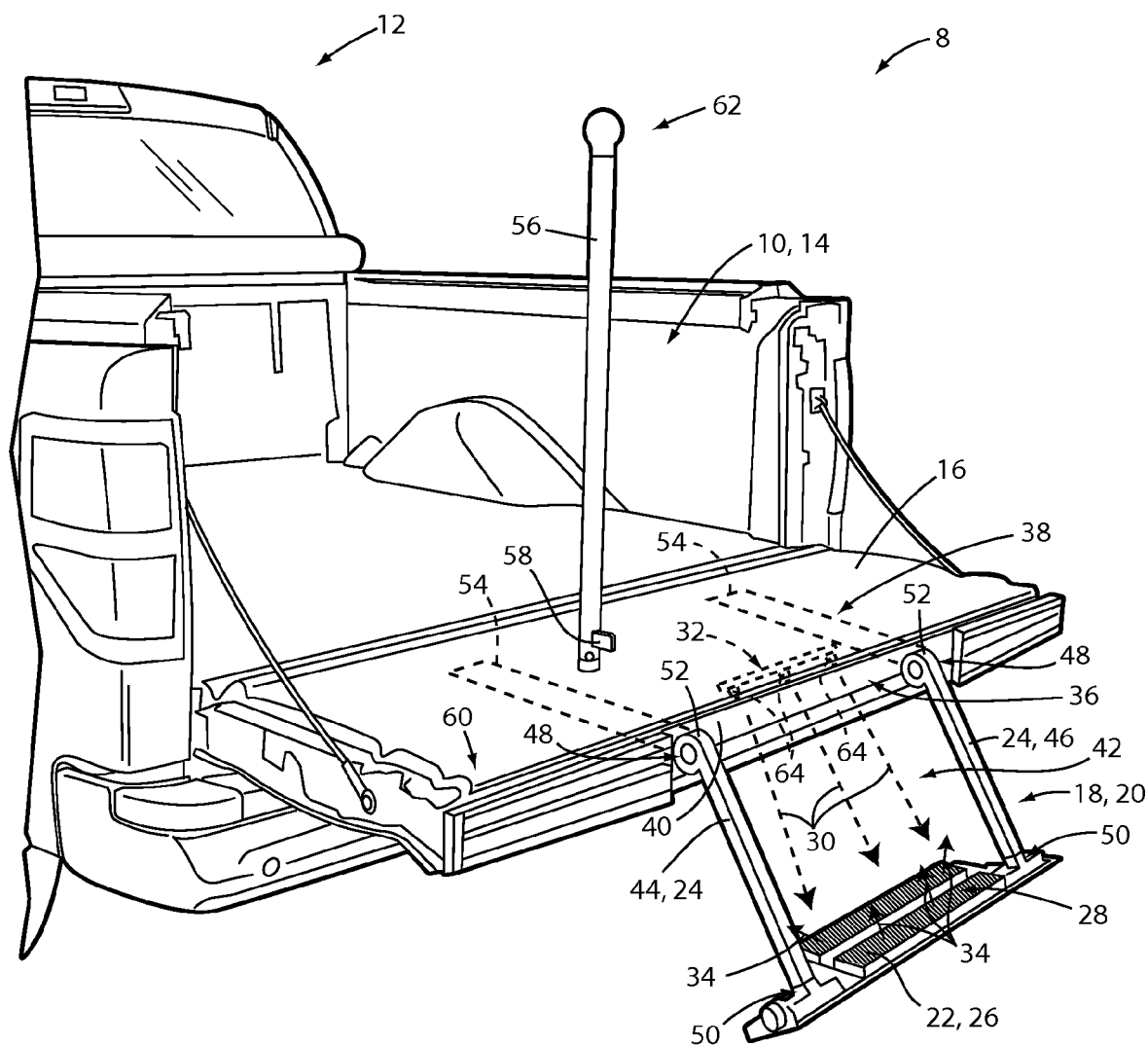
FIG. 1 is a perspective view of an exterior of a vehicle demonstrating a lighting system.

Referring to FIG. 1, a lighting system 8 is shown in a projected view of a cargo compartment 10 of a vehicle 12. The cargo compartment 10 may correspond to a bed 14 (e.g. a truck bed) having a tailgate 16 connected thereto. The tailgate 16 may comprise a retractable step 18 configured to assist in accessing the bed 14. The retractable step 18 is configured to be selectively positioned in an extended position 20 as shown in FIG. 1 and a retracted position as discussed later in reference to FIGS. 5 and 6. In the extended position 20, the retractable step 18 provides a stepping surface 22 supported by at least one support bracket 24 extending from the tailgate 16. In this configuration, the retractable step 18 may provide for the cargo compartment 10 of the vehicle 12 to be safely accessed by limiting a step height required to access the cargo compartment 10.

The retractable step 18 comprises a tread portion 26. The tread portion 26 may comprise a first photoluminescent portion 28. In the extended position 20, the first photoluminescent portion 28 may be configured to illuminate in response to receiving an excitation emission 30 at a first wavelength from a light source 32. The light source 32 may be configured to emit the excitation emission 30 toward the first photoluminescent portion 28 such that the first wavelength of the excitation emission 30 impinges upon the first photoluminescent portion 28. In response to receiving the excitation emission 30, the first photoluminescent portion 28 may become excited and emit a first output emission 34. In this way, the lighting system 8 may selectively illuminate the tread portion 26 to provide safe access to the bed 14 via the tailgate 16.

The first output emission 34 is emitted from the tread portion 26 to provide ambient light such that the tread portion 26 is clearly visible during dark environmental lighting conditions. The light source 32 may be disposed within the tailgate 16 and concealed such that the origin of the excitation emission 30 may not be substantially visible when utilizing the retractable step 18. For example, the at least one support bracket 24 of the retractable step 18 may slidably engage a cavity 36 formed by a body portion 38 of the tailgate 16. The light source 32 may be disposed on an interior wall 40 of the body portion 38 and configured to emit the excitation emission 30 through a volumetric space 42 formed between the light source 32 and the tread portion 26 in the extended position 20. As discussed further in reference to FIGS. 5 and 6, the cavity 36 formed by the body portion 38 is configured to house and conceal the at least one support bracket 24 and the tread portion 26 of the retractable step 18 in the retracted position.

The at least one support bracket 24 may correspond to a first support bracket 44 and a second support bracket 46. Each of the first support bracket 44 and the second support bracket 46 comprise a proximal end portion 48 and a distal end portion 50. At the proximal end portion 48, the support brackets 44, 46 rotatably engage a hinge support 52. Each of the hinge support 52 is configured to slidably engage a channel portion 54 formed by the body portion 38 such that each of the support brackets 24 may be received by the channel portions 54 to accommodate the at least one support bracket 24 in the retracted position.

In some implementations, a support rail 56 may be connected to the tailgate 16. The support rail 56 may be configured to collapse about a rotatable assembly 58 such that the support rail 56 may be selectively positioned in a first position or a second position. The first position may correspond to a stowed position, substantially parallel to a first surface 60 (interior surface) of the tailgate 16. The second position 62, as illustrated in FIG. 1, may correspond to an upright position extending substantially perpendicular to the first surface 60. As described herein, the support rail 56 may be accessed from the first position by rotating the support rail 56 about the rotatable assembly 58 into the second position 62. In this configuration, the support rail 56 may provide for a handle to further improve safe access to the cargo compartment 10.

The first photoluminescent portion 28 as well as additional photoluminescent portions discussed herein (e.g. a second photoluminescent portion) may be configured to convert an excitation emission emitted from the light source 32 to at least one output emission configured to illuminate at least a portion of the vehicle proximate the tailgate 16. The excitation emission 30 may comprise the first wavelength of light. The first output emission 34 and each of the output emissions discussed herein may comprise at least a second wavelength of light. The second wavelength of light may comprise at least one wavelength having a longer wavelength than the first wavelength. As discussed herein, the first photoluminescent portion 28 and other photoluminescent portions may be configured to have photochemical properties configured to convert the first wavelength of light from the light source 32 to the second wavelength. The second wavelength may comprise additional wavelengths, including various combinations of wavelengths to emit light from the lighting system 8.

The first wavelength of the excitation emission may correspond to a violet or deep blue color of light. The first wavelength may have a peak wavelength of approximately less than 500 nm. The second wavelength of the one or more output emissions may correspond to one or more wavelengths of light comprising at least one wavelength greater in length than the first wavelength. In some implementations, the second wavelength may correspond to a plurality of wavelengths that may cause the output emissions to appear as significantly white light. In this configuration, the light emitted from the light source 32 at the first wavelength is configured to excite the photoluminescent portions. In response to the excitation caused by receiving the light at the first wavelength, the photoluminescent portions may be configured to convert the first wavelength to emit output emissions to illuminate at least a portion of the vehicle 12 proximate the tailgate 16.

The light source 32 may comprise a plurality of emitters 64 in communication with a controller. The controller may be configured to selectively illuminate each of the plurality of emitters 64 in response to one or more vehicle conditions. For example, the controller may be configured to illuminate the light source 32 in response to a gear selection of a transmission of the vehicle 12, a lighting condition detected by one or more sensors in communication with the controller, an ignition event, an entry of the vehicle 12, a proximity detection of a key fob, and many additional conditions that may be detected and/or identified in signals received by the controller. In this way, the disclosure may provide for systems configured to control the lighting system 8 to provide lighting to improve safe access to the cargo compartment 10 as well as additional functions corresponding to different states of the vehicle 12.

Figure 2A:
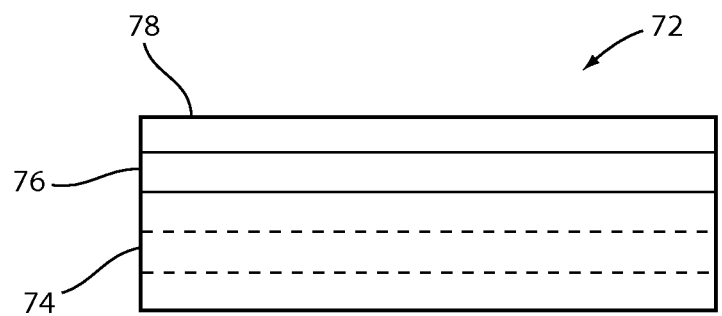
FIG. 2A illustrates a side view of a photoluminescent structure rendered as a coating.
Figure 2B:
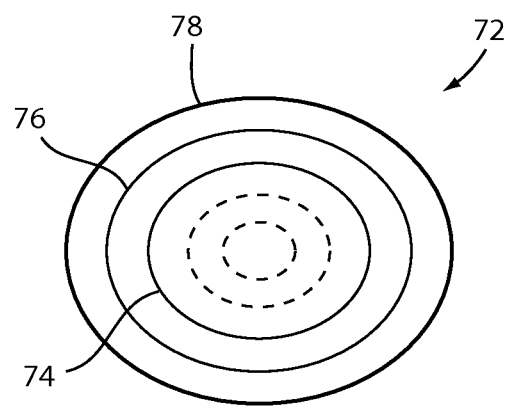
FIG. 2B illustrates a side view of a photoluminescent structure rendered as a discrete particle.
Figure 2C:
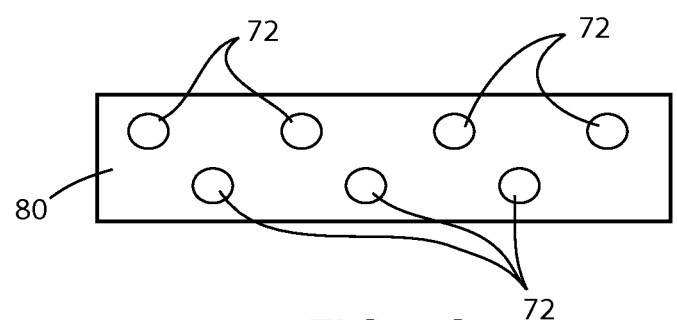
FIG. 2C illustrates a side view of a plurality of photoluminescent structures rendered as discrete particles and incorporated into a separate structure.

Referring to FIGS. 2A-2C, a photoluminescent structure 72 is generally shown rendered as a coating (e.g. a film) capable of being applied to a vehicle fixture, a discrete particle capable of being implanted in a vehicle fixture, and a plurality of discrete particles incorporated into a separate structure capable of being applied to a vehicle fixture, respectively. As described herein, a vehicle fixture may correspond to any surface or portion of the vehicle 12, for example the tread portion 26. The photoluminescent structure 72 may correspond to the photoluminescent portions as discussed herein, for example the first photoluminescent portion 28 and the second photoluminescent portion. At the most basic level, the photoluminescent structure 72 includes an energy conversion layer 74 that may be provided as a single layer or a multilayer structure, as shown through broken lines in FIGS. 2A and 2B.

The energy conversion layer 74 may include one or more photoluminescent materials having energy converting elements selected from a phosphorescent or a fluorescent material. The photoluminescent materials may be formulated to convert an inputted electromagnetic radiation into an outputted electromagnetic radiation generally having a longer wavelength and expressing a color that is not characteristic of the inputted electromagnetic radiation. The difference in wavelength between the inputted and outputted electromagnetic radiations is referred to as the Stokes shift and serves as the principle driving mechanism for an energy conversion process corresponding to a change in wavelength of light, often referred to as down conversion. In the various implementations discussed herein, each of the wavelengths of light (e.g. the first wavelength, etc.) correspond to electromagnetic radiation utilized in the conversion process.

Each of the photoluminescent portions may comprise at least one photoluminescent structure 72 comprising an energy conversion layer (e.g. conversion layer 74). The energy conversion layer 74 may be prepared by dispersing the photoluminescent material in a polymer matrix 80 to form a homogenous mixture using a variety of methods. Such methods may include preparing the energy conversion layer 74 from a formulation in a liquid carrier medium and coating the energy conversion layer 74 to a desired planar and/or non-planar substrate of a vehicle fixture. The energy conversion layer 74 may be deposited on a vehicle fixture by painting, screen printing, spraying, slot coating, dip coating, roller coating, and bar coating. Additionally, the energy conversion layer 74 may be prepared by methods that do not use a liquid carrier medium.

For example, a solid state solution (homogenous mixture in a dry state) of one or more photoluminescent materials may be incorporated in a polymer matrix 80 to provide the energy conversion layer 74. The polymer matrix 80 may be formed by extrusion, injection molding, compression molding, calendaring, thermoforming, etc. In instances where one or more energy conversion layers 74 are rendered as particles, the single or multilayered energy conversion layers 74 may be implanted into a vehicle fixture or panel. When the energy conversion layer 74 includes a multilayer formulation, each layer may be sequentially coated. Additionally, the layers can be separately prepared and later laminated or embossed together to form an integral layer. The layers may also be coextruded to prepare an integrated multilayered energy conversion structure.

Referring back to FIGS. 2A and 2B, the photoluminescent structure 72 may optionally include at least one stability layer 76 to protect the photoluminescent material contained within the energy conversion layer 74 from photolytic and thermal degradation. The stability layer 76 may be configured as a separate layer optically coupled and adhered to the energy conversion layer 74. The stability layer 76 may also be integrated with the energy conversion layer 74. The photoluminescent structure 72 may also optionally include a protection layer 78 optically coupled and adhered to the stability layer 76 or any layer or coating to protect the photoluminescent structure 72 from physical and chemical damage arising from environmental exposure.

The stability layer 76 and/or the protection layer 78 may be combined with the energy conversion layer 74 to form an integrated photoluminescent structure 72 through sequential coating or printing of each layer, or by sequential lamination or embossing. Alternatively, several layers may be combined by sequential coating, lamination, or embossing to form a substructure. The substructure may then be laminated or embossed to form the integrated photoluminescent structure 72. Once formed, the photoluminescent structure 72 may be applied to a chosen vehicle fixture.

In some implementations, the photoluminescent structure 72 may be incorporated into a vehicle fixture as one or more discrete multilayered particles as shown in FIG. 2C. The photoluminescent structure 72 may also be provided as one or more discrete multilayered particles dispersed in the polymer matrix 80 that is subsequently applied to a vehicle fixture or panel as a contiguous structure. Additional information regarding the construction of photoluminescent structures to be utilized in at least one photoluminescent portion of a vehicle is disclosed in U.S. Pat. No. 8,232,533 to Kingsley et al., entitled "PHOTOLYTICALLY AND ENVIRONMENTALLY STABLE MULTILAYER STRUCTURE FOR HIGH EFFICIENCY ELECTROMAGNETIC ENERGY CONVERSION AND SUSTAINED SECONDARY EMISSION," filed Nov. 8, 2011, the entire disclosure of which is incorporated herein by reference.

Figure 3:
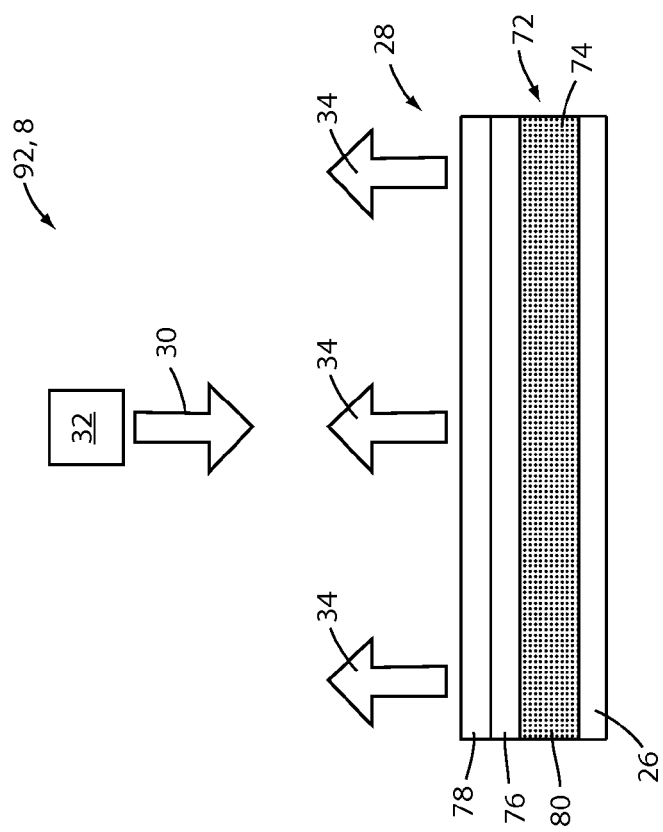
FIG. 3 is schematic view of a front-lit configuration of a lighting apparatus configured to convert a first wavelength of light to at least a second wavelength.

Referring to FIG. 3, the lighting system 8 is generally shown according to a front-lit configuration 92. In this configuration, the light or an excitation emission 30 is emitted from the light source 32 and is converted to a first output emission 34 by the energy conversion layer 74. The first output emission 34 may correspond to an output emission generated by the first photoluminescent portion 28 disposed proximate the tread portion 26 of the retractable step 18. The first photoluminescent portion 28 is discussed further in reference to FIG. 7.

The excitation emission 30 comprises a first wavelength $\lambda_1$, and the output emissions comprise at least the second wavelength. The lighting system 8 comprises the photoluminescent structure 72 disposed on or in at least one photoluminescent portion 28. The photoluminescent structure 72 may be rendered as a coating and applied to a substrate 82 of a vehicle fixture, for example the tread portion 26 of the retractable step 18. The photoluminescent material may also be dispersed as a polymer matrix 80 corresponding to the energy conversion layer 74, which may be utilized to form the tread portion 26.

In some implementations, the energy conversion layer 74 may further include the stability layer 76 and/or the protection layer 78. In response to the light source 32 being activated, the excitation emission 30 is received by the energy conversion layer 74 and converted from the first wavelength $\lambda_1$ to an output emission having at least the second wavelength, for example, the first output emission 34. Each of the output emissions may comprise a plurality of wavelengths configured to emit any color of light from each of the photoluminescent portions discussed herein. In some implementations, each of the output emissions may correspond to different colors of light. The colors of light of the output emissions may correspond to the photochemical structure of each of the photoluminescent portions. In this way, each of the output emissions may be configured to emit different colors of light in response to receiving an excitation emission.

In various implementations, the lighting system 8 comprises at least one photoluminescent material incorporated in the polymer matrix 80 and/or energy conversion layer 74 and is configured to convert the excitation emission at the first wavelength $\lambda_1$ to the output emissions having at least the second wavelength. In order to generate the plurality of wavelengths, the energy conversion layer 74 may comprise one or more photoluminescent materials configured to emit the output emissions as wavelengths of light in the red, green, and/or blue color spectrums. Such photoluminescent materials may further be combined to generate a wide variety of colors of light for the output emissions. For example, the red, green, and blue-emitting photoluminescent materials may be utilized in a variety of proportions and combinations to control the output color of the output emissions.

Each of the photoluminescent materials may vary in output intensity, output wavelength, and peak absorption wavelengths based on a particular photochemical structure and combinations of photochemical structures utilized in the energy conversion layer 74. As an example, the first output emission 34 may be changed by adjusting the wavelength of an excitation emission to activate the photoluminescent materials at different intensities to alter the color of the first output emission 34. In addition to, or alternatively to the red, green, and blue-emitting photoluminescent materials, other photoluminescent materials may be utilized alone and in various combinations to generate the output emissions in a wide variety of colors. In this way, the lighting system 8 may be configured for a variety of applications to provide a desired lighting color and effect for the vehicle 12.

To achieve the various colors and combinations of photoluminescent materials described herein, the lighting system 8 may utilize any form of photoluminescent materials, for example phospholuminescent materials, organic and inorganic dyes, etc. For additional information regarding fabrication and utilization of photoluminescent materials to achieve various emissions, refer to U.S. Pat. No. 8,207,511 to Bortz et al., entitled "PHOTOLUMINESCENT FIBERS, COMPOSITIONS AND FABRICS MADE THEREFROM," filed Jun. 5, 2009; U.S. Pat. No. 8,247,761 to Agrawal et al., entitled "PHOTOLUMINESCENT MARKINGS WITH FUNCTIONAL OVERLAYERS," filed Oct. 19, 2011; U.S. Pat. No. 8,519,359 B2 to Kingsley et al., entitled "PHOTOLYTICALLY AND ENVIRONMENTALLY STABLE MULTI-LAYER STRUCTURE FOR HIGH EFFICIENCY ELECTROMAGNETIC ENERGY CONVERSION AND SUSTAINED SECONDARY EMISSION," filed Mar. 4, 2013; U.S. Pat. No. 8,664,624 B2 to Kingsley et al., entitled "ILLUMINATION DELIVERY SYSTEM FOR GENERATING SUSTAINED SECONDARY EMISSION," filed Nov. 14, 2012; U.S. Patent Publication No. 2012/0183677 to Agrawal et al., entitled "PHOTOLUMINESCENT COMPOSITIONS, METHODS OF MANUFACTURE AND NOVEL USES," filed Mar. 29, 2012; U.S. Patent Publication No. 2014/0065442 A1 to Kingsley et al., entitled "PHOTOLUMINESCENT OBJECTS," filed Oct. 23, 2012; and U.S. Patent Publication No. 2014/0103258 A1 to Agrawal et al., entitled "CHROMIC LUMINESCENT COMPOSITIONS AND TEXTILES," filed Dec. 19, 2013, all of which are incorporated herein by reference in their entirety.

The light source 32 may also be referred to as an excitation source and is operable to emit at least the excitation emission 30 or any of the excitation emissions discussed herein. The light source 32 or each of the emitters 64 may comprise any form of light source, for example halogen lighting, fluorescent lighting, light emitting diodes (LEDs), organic LEDs (OLEDs), polymer LEDs (PLEDs), solid state lighting or any other form of lighting configured to output the excitation emissions. The excitation emissions from the light source 32 may be configured such that the first wavelength $\lambda_1$ corresponds to at least one absorption wavelength of the one or more photoluminescent materials of the energy conversion layer 74 and/or polymer matrix 80. In response to receiving the light at the first wavelength $\lambda_1$, the energy conversion layer 74 may be excited and output the one or more output wavelengths, for example, the second emission having the second wavelength $\lambda_2$. The excitation emission 30 provides an excitation source for the energy conversion layer 74 by targeting absorption wavelengths of a particular photoluminescent material or combination thereof utilized therein. As such, the lighting system 8 may be configured to output the output emissions at a desired light intensity and color.

In an exemplary implementation, the light source 32 comprises an LED configured to emit the first wavelength $\lambda_1$ which may correspond to a blue spectral, violet, and/or ultraviolet color range. The blue spectral color range comprises a range of wavelengths generally expressed as blue light (~440-500 nm). In some implementations, the first wavelength $\lambda_1$ may comprise a wavelength in the ultraviolet and near ultraviolet color range (~100-450 nm). In an exemplary implementation, the first wavelength $X_1$ may be approximately equal to 470 nm. Though particular wavelengths and ranges of wavelengths are discussed in reference to the first wavelength $\lambda_1$, the first wavelength $X_1$ may generally be configured to excite any photoluminescent material.

In an exemplary implementation, the first wavelength $X_1$ may be approximately less than 500 nm. The blue spectral color range and shorter wavelengths may be utilized as an excitation source for the lighting system 8 due to these wavelengths having limited perceptual acuity in the visible spectrum of the human eye. By utilizing shorter wavelengths for the first wavelength $\lambda_1$, and converting the first wavelength with the conversion layer 74 to at least one longer wavelength, the lighting system 8 may create a visual effect of light originating from the photoluminescent structure 72. In this configuration, the lighting system 8 may provide for a cost effective system to provide lighting in a variety of locations.

As discussed herein, each of the plurality of wavelengths corresponding to the output emissions may correspond to a significantly different spectral color range. The second wavelength may correspond to a plurality of wavelengths configured to appear as substantially white light. The plurality of wavelengths may be generated by a red-emitting photoluminescent material having a wavelength of approximately 620-750 nm, a green emitting photoluminescent material having a wavelength of approximately 526-606 nm, and a blue or blue-green emitting photoluminescent material having a wavelength longer than the first wavelength $\lambda_1$ and approximately 430-525 nm in one embodiment. The plurality of wavelengths may be utilized to generate a wide variety of colors of light from each of the photoluminescent portions converted from the first wavelength $\lambda_1$.

Figure 4:
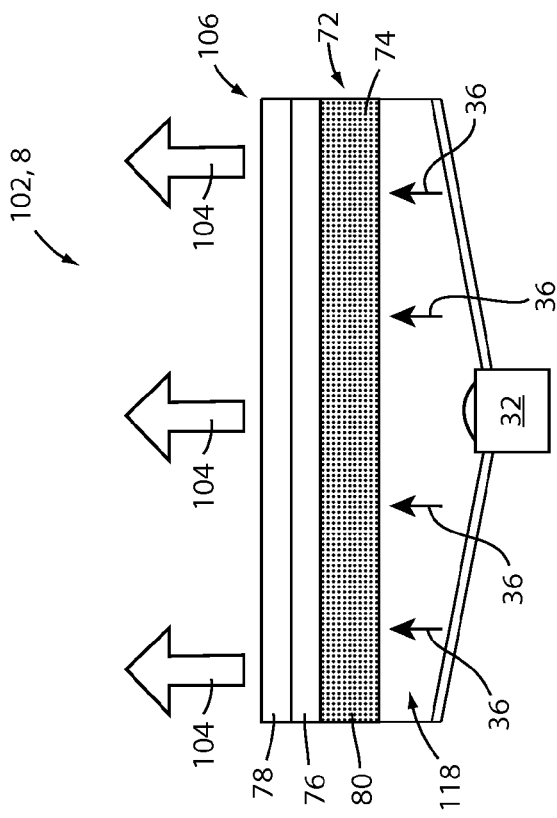
FIG. 4 is schematic view of a back-lit configuration of a lighting apparatus configured to convert a first wavelength of light to at least a second wavelength.

Referring to FIG. 4, the lighting system 8 is generally shown according to a back-lit configuration 102 to convert the excitation emission 30 from the light source 32 to a second output emission 104. The back-lit configuration 102 may correspond to a configuration discussed in reference to FIG. 6 demonstrating a light guide 120 and a second photoluminescent portion 106. The back-lit configuration 102 comprises an energy conversion layer 74 and/or photoluminescent material dispersed in a polymer matrix 80. Similar to the energy conversion layer 74 demonstrated in reference to the front-lit configuration 92, the energy conversion layer 74 may be configured to be excited and output the one or more wavelengths corresponding to the second wavelength in response to receiving the excitation emission 30. In the back-lit configuration, the polymer matrix may be of at least partially transparent material such that the excitation emission may be converted by the second photoluminescent portion to emit the second output emission 104.

The plurality of wavelengths of the second output emission 104 may be configured to emit any color of light from the second photoluminescent portion 106 in response to the excitation of the energy conversion layer 74. The color of the light corresponding to the second output emission 104 may be controlled by utilizing particular types and/or ratios of photoluminescent materials as discussed herein. The second output emission 104 may correspond to light output that may illuminate at least a portion of the vehicle 12 proximate the tailgate 16. In this configuration, the lighting system 8 may be operable to illuminate an exterior portion of the vehicle 12.

In some implementations, each of the photoluminescent portions 28, 106 may comprise an organic or inorganic fluorescent dye configured to convert the excitation emission 30 to the output emission. For example, the photoluminescent portions 28, 106 may comprise a photoluminescent structure of rylenes, xanthenes, porphyrins, phthalocyanines, or other materials suited to a particular Stokes shift defined by the first absorption range and emission fluorescence. In some embodiments, the photoluminescent portions 28, 106 may be of at least one inorganic luminescent material selected from the group of phosphors. The inorganic luminescent material may more particularly be from the group of Ce-doped garnets, such as YAG:Ce. As such, the each of the photoluminescent portions 28, 106 may be selectively activated by a wide range of wavelengths received from the excitation emission 30 configured to excite a specific photoluminescent material and emit an output emission having a desired color.

Figure 5:
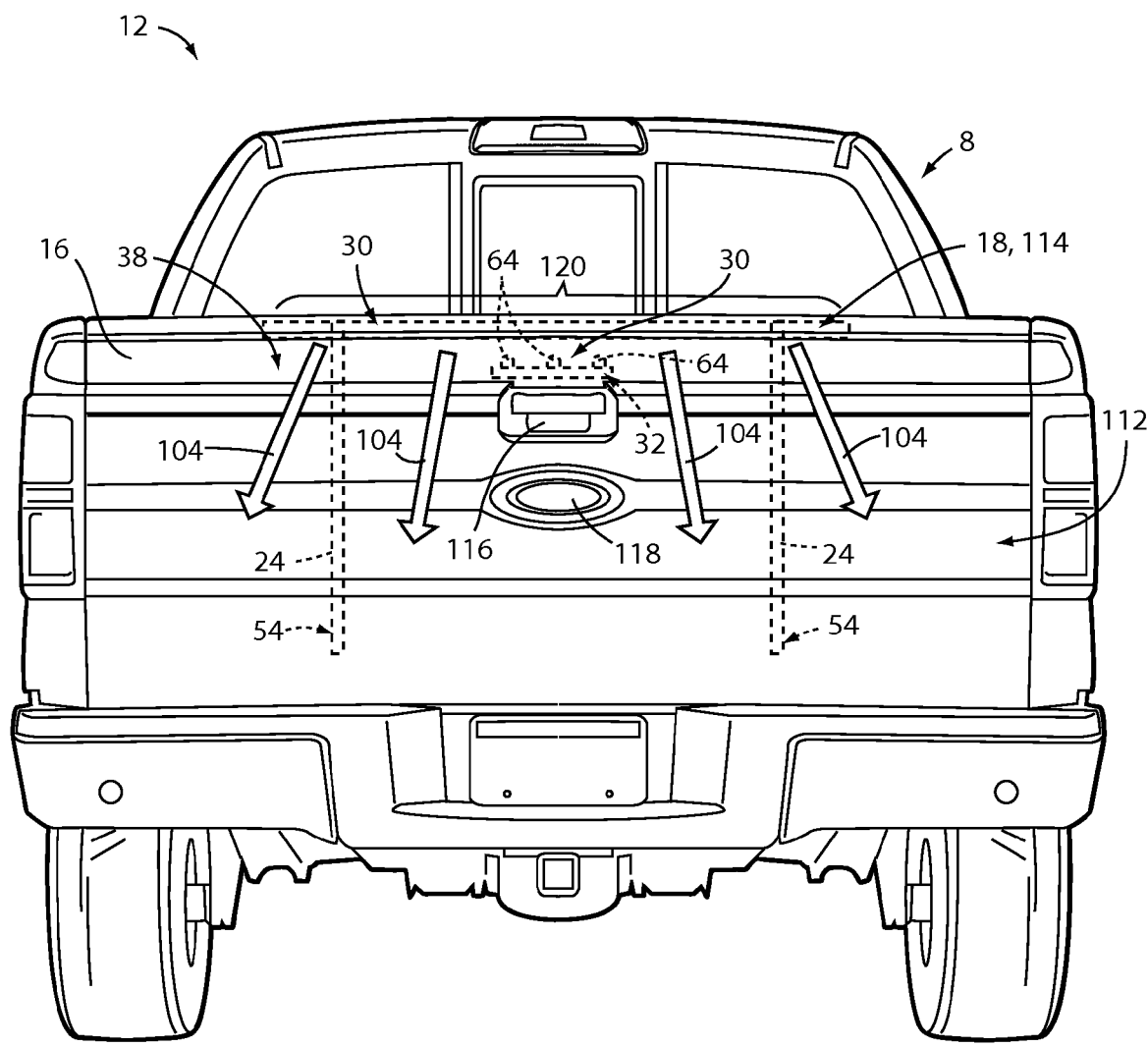
FIG. 5 is a projected view of a tailgate of a vehicle demonstrating a lighting system.
Figure 6:
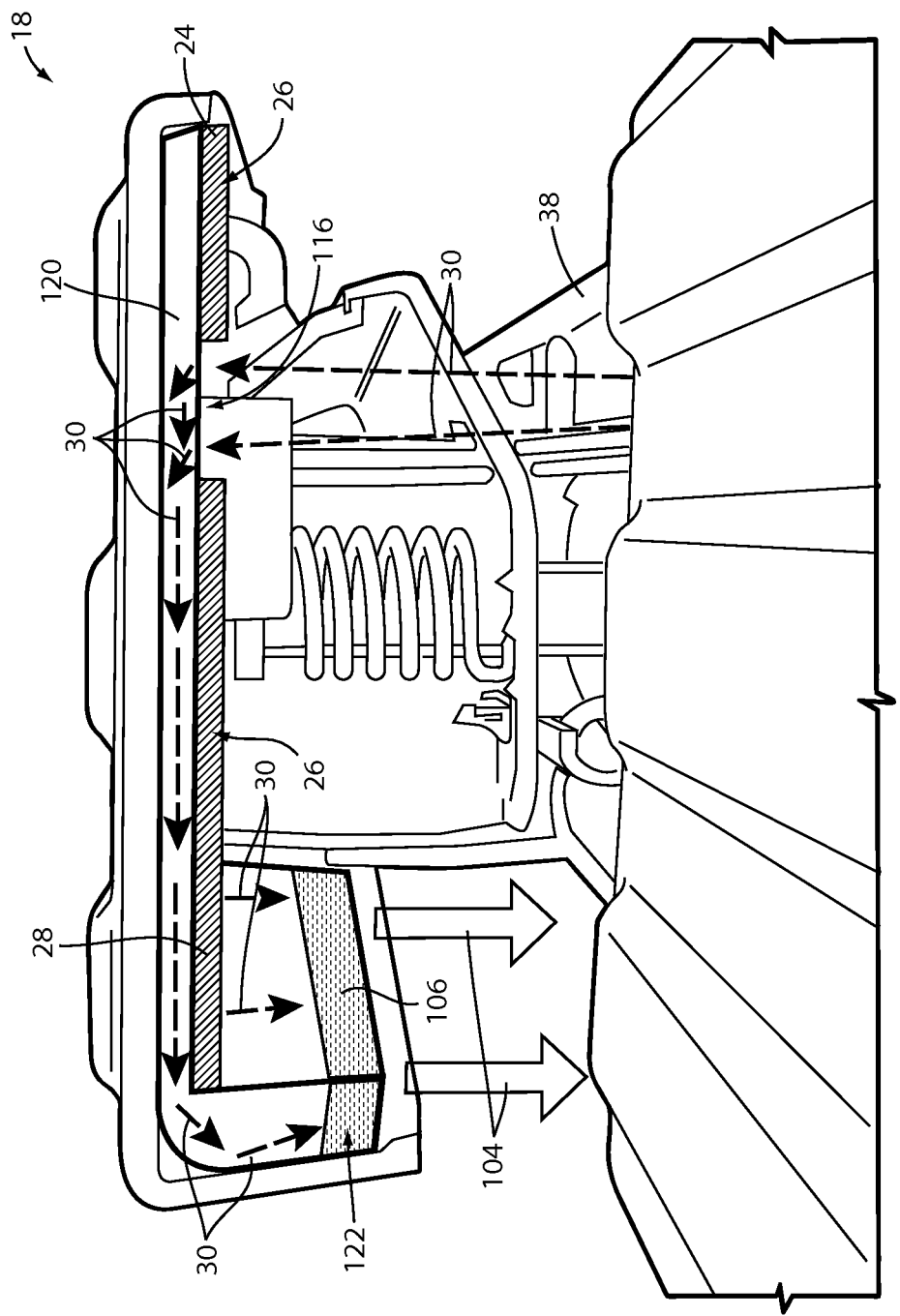
FIG. 6 is a side profile view of a retractable step disposed in a tailgate demonstrating a lighting system.

Referring now to FIGS. 5 and 6, a projected view and a side view of the vehicle 12 demonstrating the lighting system 8 are shown, respectively. FIG. 5 demonstrates the second surface 112 or an exterior surface of the tailgate 16 of the vehicle 12 having the retractable step 18 in a retracted position 114 and concealed within the body portion 38 of the tailgate 16. As show the at least one support bracket 24 is disposed within the cavity 36, retracted within the channel portions 54 shown as hidden lines. In the retracted position 114, the lighting system 8 is configured to illuminate at least a portion of the second surface 112 by selectively illuminating the second photoluminescent portion 106. For example, the lighting system 8 may be configured to illuminate a handle 116 or badge 118 disposed on the second surface 112.

In the retracted position 114, the light source 32 or each of the emitters 64 may be aligned with apertures formed in the tread portion 26 of the retractable step 18. In this configuration, the excitation emission 30 may be directed through the apertures and into a light guide 120. The light guide 120 may be composed of a light transmissive material and configured to direct light along a length 120 of the cavity 36 formed by the body portion 38. In some implementations, the light guide 120 may be of polymeric material operable to efficiently transmit the first wavelength of the excitation emission 30 therethrough. The light guide 120 may also be configured to distribute the excitation emission 30 substantially along the length 120 of the cavity 36.

In the retracted position 114, the light guide 120 may direct the excitation emission 30 toward an optic 122. The optic 122 may be configured in the back-lit configuration 102 and comprise the second photoluminescent portion 106. In response to receiving the excitation emission 30, the second photoluminescent portion 106 may become excited and emit the second output emission 104. As such, the optic 122 may be configured to convert the excitation emission 30 to the second output emission 104. In this configuration, the second output emission 104 may be directed by the optic 122 such that at least a portion of the second surface 112 is illuminated.

As discussed herein, the disclosure provides for a flexible lighting system operable to illuminate a tread portion of a retractable step and an exterior surface of a tailgate in a first position and a second position, respectively. The first position corresponds to the retractable step being arranged in an extended position. The second position corresponds to the retractable step being arranged in a retracted position. The unique system provides for a single light source to be utilized to selectively illuminate the tailgate and the tread portion of the step based on a position of the retractable step.

Figure 7:
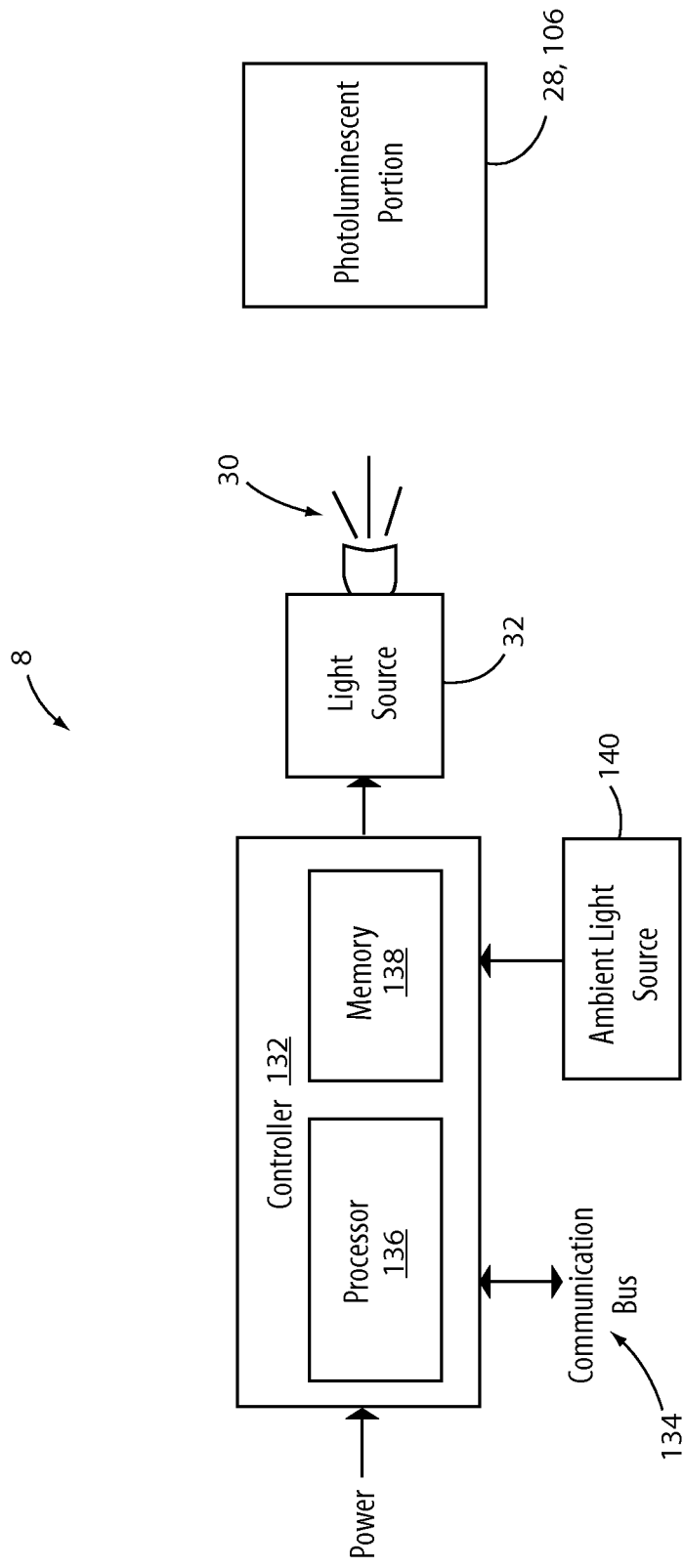
FIG. 7 is a block diagram of a lighting system configured to illuminate at least one photoluminescent portion.

Referring now to FIG. 7, a block diagram of the lighting system 8 demonstrating a lighting controller 132 configured to control the illumination of the light source 32 to illuminate the photoluminescent portions 28, 106. The lighting controller 132 may be in communication with a communication bus 134 of the vehicle. The communication bus may be configured to deliver signals to the lighting controller 132 identifying various vehicle states. For example, the communication bus 134 may be configured to communicate to the lighting controller 132 a drive selection of the vehicle, an ignition state, a remote activation of the light source 32, or any other information or control signals that may be utilized to adjust the illumination of the lighting system 8. In this way, the lighting controller 132 may be selectively activated in response to one or more states of the vehicle. Though the lighting controller 132 is discussed herein, in some embodiments the light source 32 may be activated in response to an electrical or electro-mechanical switch in response to a position of the retractable step 18 and/or the tailgate 16.

The lighting controller 132 may comprise a processor 136 comprising one or more circuits configured to receive the signals from the communication bus 134 and output signals to control the light source 32 to emit the excitation emission 30. The processor 136 may be in communication with a memory 138 configured to store instructions to control the activation of the light source 32. The lighting controller 132 may further be in communication with an ambient light sensor 140. The ambient light sensor 140 may be operable to communicate a light condition, for example a level brightness or intensity of the ambient light proximate the vehicle 12. In response to the level of the ambient light, the lighting controller 132 may be configured to adjust a light intensity output from the light source 32. The intensity of the light output from the light source 32 may be adjusted by controlling a duty cycle, current, or voltage supplied to the light source 32.

For the purposes of describing and defining the present teachings, it is noted that the terms "substantially" and "approximately" are utilized herein to represent the inherent degree of uncertainty that may be attributed to any quantitative comparison, value, measurement, or other representation. The term "substantially" and "approximately" are also utilized herein to represent the degree by which a quantitative representation may vary from a stated reference without resulting in a change in the basic function of the subject matter at issue.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A vehicle illumination apparatus comprising:
   a retractable step in connection with a panel of the vehicle and comprising a tread portion;
   a light source disposed proximate the panel configured to emit a first emission having a first wavelength; and
   a first photoluminescent portion disposed on the tread portion configured to emit a second emission having a second wavelength in response to receiving the first emission.

2. The apparatus according to claim 1, wherein the first emission is directed toward the first photoluminescent portion in response to the step arranged in an extended position.

3. The apparatus according to claim 1, wherein the panel corresponds to a tailgate of the vehicle.

4. The apparatus according to claim 1, wherein the first wavelength corresponds to a different color of light than the second wavelength.

5. The apparatus according to claim 1, wherein the retractable step is configured to be concealed within the tailgate of the vehicle in a retracted position.

6. The apparatus according to claim 5, further comprising a second photoluminescent portion configured to receive the first emission in response to the step oriented in the retracted position.

7. The apparatus according to claim 6, wherein the tread portion comprises a light guide configured to receive the first emission in the retracted position.

8. The apparatus according to claim 7, wherein the light guide comprises a light transmissive body portion configured to direct the first emission therethrough and direct the first emission toward the second photoluminescent portion.

9. The apparatus according to claim 8, wherein the second photoluminescent portion is disposed in an optic and optically coupled to the light guide.

10. The apparatus according to claim 9, wherein the optic is configured to emit a third emission from the second photoluminescent portion.

11. The apparatus according to claim 10, wherein the third emission is directed by the optic to illuminate at least a portion of an exterior surface of the tailgate in response to the step oriented in the retracted position.

12. A vehicle illumination apparatus comprising:
a retractable step in connection with a tailgate and configured to be arranged in an extended position and a retracted position, the step comprising a tread portion;
a light source disposed proximate the tailgate and configured to emit a first emission; and
a first photoluminescent portion disposed on the tread portion and configured to illuminate in the extended position in response to receiving the first emission.

13. The apparatus according to claim 12, wherein the retractable step is configured to be concealed within the tailgate of the vehicle in the retracted position.

14. The apparatus according to claim 12, wherein the first photoluminescent portion is configured to emit a second emission having a different color than the first emission.

15. The apparatus according to claim 12, further comprising a second photoluminescent portion configured to receive the first emission when the step is in the retracted position.

16. The apparatus according to claim 12, further comprising a second photoluminescent portion disposed proximate the tread portion configured to illuminate in the retracted position.

17. The apparatus according to claim 16, wherein the second photoluminescent portion is configured to illuminate in response to receiving the first emission in the retracted position.

18. A vehicle illumination apparatus comprising:
a retractable step in connection with a tailgate and configured to be arranged in an extended position and a retracted position, the step comprising a tread portion;
a light source disposed in a body formed by the tailgate and configured to emit a first emission;
a first photoluminescent portion disposed on the tread portion configured to illuminate in the extended position in response to receiving the first emission; and
a second photoluminescent portion disposed proximate the tread portion configured to illuminate in the retracted position.

19. The apparatus according to claim 18, wherein the first emission is transmitted through a volumetric space between the light source and the tread portion to excite the first photoluminescent portion in the extended position.

20. The apparatus according to claim 18, further comprising a light guide disposed proximate the tread portion and configured to receive the first emission and transmit the first emission to a second photoluminescent portion in the retracted position.

* * * * *